Sept. 18, 1956 R. GOTTSCHALK 2,763,178
APPARATUS FOR VIEWING MOTION PICTURE FILM
Filed Jan. 29, 1952 3 Sheets-Sheet 1
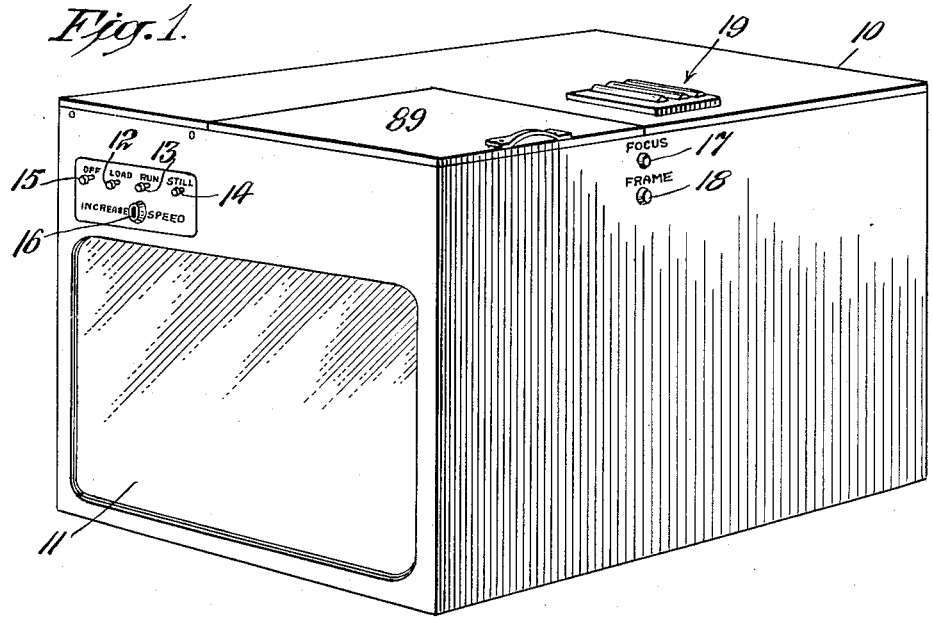
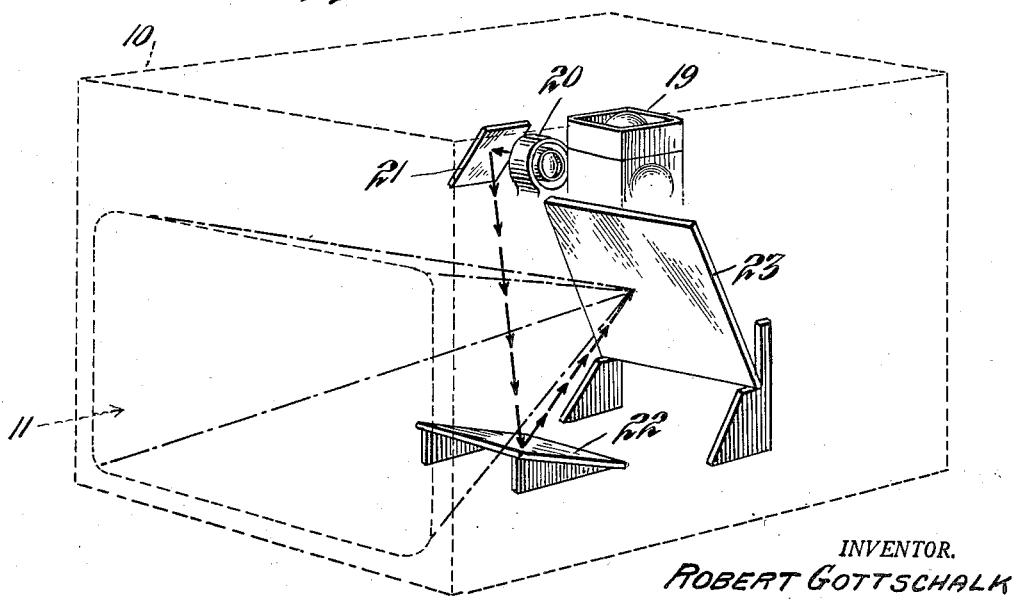
INVENTOR.
ROBERT GOTTSCHALK
BY
*Philip S. McLean*
ATTORNEY.

Sept. 18, 1956 R. GOTTSCHALK 2,763,178
APPARATUS FOR VIEWING MOTION PICTURE FILM
Filed Jan. 29, 1952 3 Sheets-Sheet 2

INVENTOR.
ROBERT GOTTSCHALK
BY
ATTORNEY

Sept. 18, 1956 R. GOTTSCHALK 2,763,178
APPARATUS FOR VIEWING MOTION PICTURE FILM
Filed Jan. 29, 1952 3 Sheets-Sheet 3
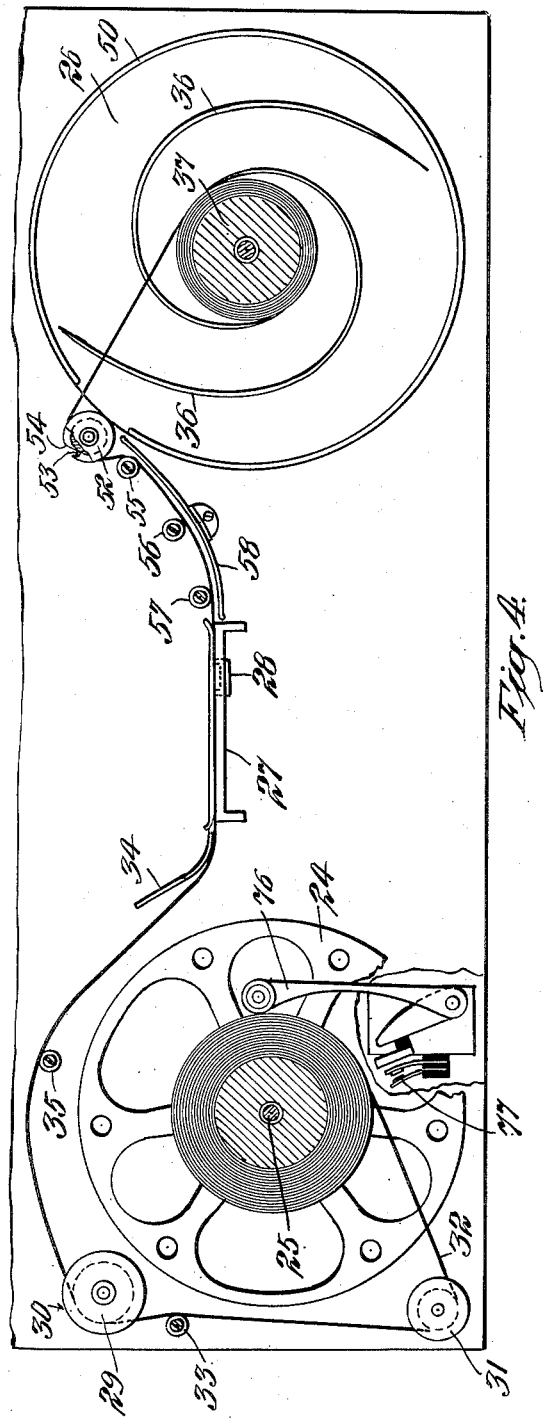
INVENTOR.
ROBERT GOTTSCHALK
BY
Philip D. McBean
ATTORNEY

United States Patent Office 2,763,178
Patented Sept. 18, 1956

2,763,178

APPARATUS FOR VIEWING MOTION PICTURE FILM

Robert Gottschalk, Wichita, Kans., assignor of one-fourth to Charles J. Davis, Derby, Kans.

Application January 29, 1952, Serial No. 268,761

5 Claims. (Cl. 88—18.4)

The invention herein disclosed relates to apparatus for viewing motion picture film and is a partial continuation of copending patent application Serial No. 187,424, filed September 29th 1950.

Special objects of the invention are to provide a viewer for motion picture film in the form of a single, compact unit of a portable nature and carrying within it the mechanism necessary for advancing, projecting and viewing the film.

Other important objects of the invention are to simplify and improve the mechanism for directing and feeding the film and for controlling the automatic action both in the viewing and in the rewinding stages of operation.

Other desirable objects attained by the invention and the novel features of construction, combinations and relations of parts embodying the invention are set forth or will appear in the course of the following specification.

The drawings accompanying and forming part of the specification illustrate present preferred embodiments of the invention but structure and arrangement may be modified and changed as regards such illustration, all within the true intent and broad scope of the invention as hereinafter defined and claimed.

Fig. 1 in the drawings is a front perspective view of one of the complete units;

Fig. 2 is a diagrammatic view illustrating the optical system;

Fig. 4 is a broken plan view illustrating travel of film between the supply reel and film receiver;

Fig. 5 is an enlarged broken and part sectional detail view of the film receiver as on substantially the plane of line 5—5 of Fig. 3;

Fig. 6 is a horizontal sectional and broken plan view on substantially the plane of line 6—6 of Fig. 5;

Fig. 7 is a broken sectional detail of one of the film gripping flanged rollers.

Figure 3:
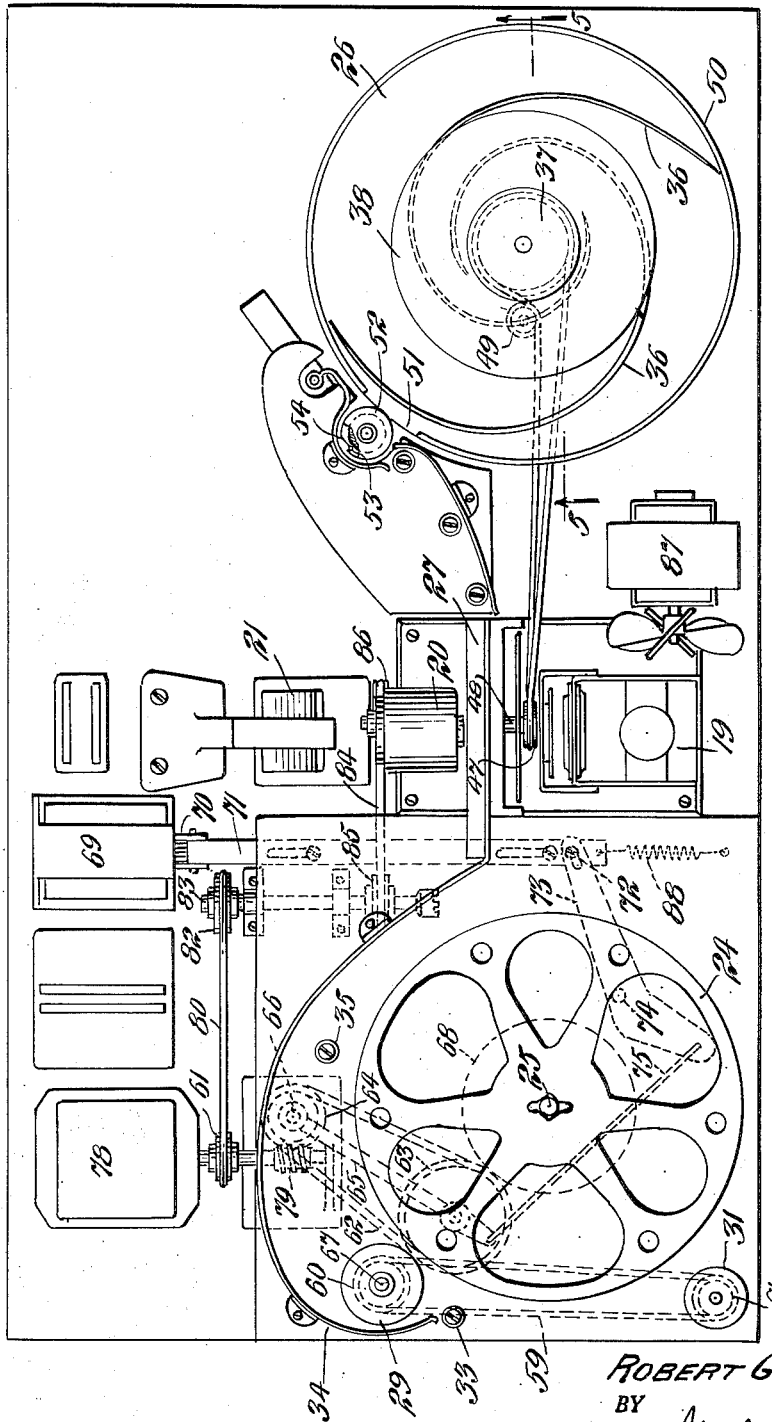
Fig. 3 is a plan view of main portions of the apparatus as removed from the cabinet.

The complete apparatus, as shown in Fig. 1, comprises a cabinet 10, which may be of ornamental design, having a viewing screen 11 at the front and carryying suitable controls such as buttons 12, 13, 14, 15 for "load," "run", "still" and "off", a knob 16 for increasing or reducing speed and knobs 17, 18, for focusing and framing.

Fig. 2 shows diagrammatically how the picture is projected by lantern 19, projecting lens 20 and inclined reflectors 21, 22, 23, onto the back of the translucent screen 11.

The film handling mechanism is on the order of that disclosed in the copending patent application identified, as involving a film supply reel 24 keyed in horizontal relation on the upper end of a vertical shaft 25, a horizontally disposed film receiver tray or pan 26 with horizontal film guide or gate 27 and oscillating feed claw 28 between supply reel and receiver, and a continuously rotating looper 29 for snatching film from the supply reel and advancing it as a free loop to the action of the oscillating feed claw.

The looper 29 is of the same design as disclosed in the prior application, having opposed, convergently inclined flanges 30, Fig. 7, spaced to frictionally grip opposite edges of the film with a wedging engagement.

In the present invention, however, more than one of these loopers is employed.

As shown in Figs. 3 and 4, two such loopers 29 and 31 are provided for taking the film 32 from the supply reel, these being spaced apart, at the side of the reel, with a loose guide roller 33 between them for pressing the intervening stretch of film inward into the bite of the convergently inclined film gripping flanges 30.

A curved guide 34 about the back of looper 29 and extending to the film gate 27, confines the free loop of film sufficiently to keep it in line with the looper, and another idler roll 35 holds the free loop of film outward away from the supply reel.

The receiver 26 is shown as an open top pan or tray having spiral ribs 36 on the bottom of the same tending, in the rotation of the pan, to direct the leading end of the film inward toward the core or spool center 37 having a downwardly convergent conical confining flange 38 which acts to wedge and crowd the film inward into closely wrapped condition on the spool.

The receiver is driven through a magnetic slip clutch so as not to drag the film away from the feed claw, this clutch being shown as a pair of permanent magnets 39 on a pulley 40 in magnetically coupled relation with an armature 41 on the bottom of the pan.

Pulley 40 is shown carried by a shaft 42 stepped in a bearing pedestal 43, and the pan is shown carried by a stub shaft 44 stepped in a bearing 45 in the upper end of the pulley shaft.

The belt 46 for driving pulley 40 is shown as extending from a pulley 47 on the shutter shaft 48, Fig. 3, and as running about an idler 49 holding it closely engaged with pulley 40.

The rim portion 50 of the receiving pan may be a stationary wall, serving as a guide for the film and having a gap 51 in the side of it where the film passees into and out of the receiver.

At this gap in the wall of the receiver a snubber roller 52 is located, this roller having the convergently inclined flanges such as 30, heretofore disclosed, for gripping the opposite edges of the film.

A ratchet in the form of a spring pin 53 to enter an inclined notch 54 in one flange, serves to hold the roller stationary while the film is feeding into the receiver and to permit the roller to turn freely while the film is being drawn out of the receiver.

Idler rolls 55, 56, 57, serve to hold the film about the snubber roller and against the back of the stationary curved guide 58 extending from the film gate toward the receiver.

The takeoff loopers 29 and 30 are shown in Fig. 3 as coupled to rotate in unison by belt and pulley connections 59, 60, 61, and the drive of these loopers is effected as in the companion application identified, by a friction clutch in the form of a belt 62 carried by pulleys 63, 64, on a frame 65 which can be swung on the drive pulley center 66 to carry belt 62 into driving engagement with a friction wheel on the shaft 67 of the looper 29.

During the projection or viewing sequence the loopers 29 and 31 are driven through the connections described to pull film off the supply reel and advance it as fast as the oscillating claw will take it.

During the rewinding operations the loopers 29 and 31 are free and the reel 24 is turned in a rewinding direction by engagement of the belt 62 with a friction wheel 68 on the reel shaft 25.

This is accomplished by a solenoid 69, Fig. 3, operating on core 70 to pull a slide 71 connected at 72 with a lever 73, pivoted at 74 and connected by link 75 with the swinging frame 65.

Solenoid 69 is automatically energized, near the end of the viewing operation, by a feeler lever 76, Fig. 4, bearing against the unwinding film on reel 24 and serving to actuate a microswitch 77 or the like connected in circuit with the solenoid. Therefore, so long as switch 77 remains closed the solenoid will be kept energized to hold the frame 65 over to the right as in Fig. 3, with the belt 62 in frictional driving engagement with the friction roller 68 on the supply reel shaft.

In the change-over from viewing to rewinding, the motor is automatically reversed and this, through a reverse clutch in the drive connections to the shutter shaft 48, as in the prior application identified, permits the shutter shaft and parts associated therewith, such as the oscillating claw, to remain stationary during rewinding.

As a consequence the receiver pan is not driven during rewinding and is free to turn with the film being withdrawn from spool 37, the magnetic coupling at such time acting as a brake to prevent overrunning and tangling of the film.

The snubber roller 52 rotating with the film in the rewinding operation, serves to withdraw the film evenly from the receiver spool.

The drive gearing and control mechanism may be generally the same as in the copending patent application, comprising, as indicated in Fig. 3, a motor 78 driving the shaft 66 for the shiftable clutch belt 62 by spiral gears 79 and operating the shutter shaft through belt connections; the several controls as first above referred to being the same as in the patent application.

The belt connections are shown as made up of a belt 80 running from pulley 81 on the motor shaft to pulley 82 on a jack shaft 83, and a second pulley, 84, running from pulley 85 on the jack shaft to pulley 86 on the shutter shaft 48. The latter pulley, 86, may be the one having the one-way drive clutch incorporated therein, as in the patent application, but this one-way drive clutch which permits the shutter shaft and parts operated thereby to stand still when the motor is reversed for rewinding, may be incorporated in any one of the other pulleys 81, 82 or 85, since any one of these locations would accomplish the desired results described in the copending patent application, of having the shutter, the film feeding claw and the receiver all remain at rest, with the film gate open to permit free passage of the film during the rewinding operation.

A small electric fan is indicated at 87 for keeping the lamp cool, this being connected to be in operation whenever the lamp is on, either in the running of the film or for showing separate frames or stills.

A spring is indicated at 88 connected to oppose the action of the solenoid and therefore arranged to hold the clutch belt 62 engaged with the companion friction clutch pulley on looper shaft 67 so long as the solenoid is not energized.

The control 12 for the loading operation is connected as in the copending patent application, to energize the solenoid while the film is being placed in the machine, thus to hold the film gate open and the claw in the lifted position while the lead end of the film is being inserted in the guide far enough for feeding engagement by the claw.

A trap door is shown provided in the top of the cabinet at 89, Fig. 1, affording access for placing the reel of film over shaft 25 and for looping film about the looper rolls 31 and 29 and for passing the leading end of the film through the gate 27 and about guide rolls 57, 56, 55, and around the snubber roll 52 through gap 51 into the film receiver 26.

The loopers 31 and 29 may be of the same or different diameters and be driven at equal or different speeds. In the illustration, Figs. 3 and 4, the first looper, 31, is shown as of somewhat smaller diameter than, but driven at substantially the same peripheral speed as the second looper 29, so as to operate possibly slightly faster in gripping the film. Thus a relatively slight tightening movement of the film about the roller 31 will effect a quick gripping engagement of the inclined convergent flanges 30 on the edges of the film, making this looper very sensitive to any pull of film exerted by the looper 29. The latter, as in the prior patent application, is governed for its operation by pull on the film applied by the claw. A more sensitive and positive action is therefore obtained by the use of the two loopers with one, 29, governed by the feeding action of the claw, and this one controlling action of the primary looper 31 which directly pulls the film from the supply spool.

The snubber roll 52 being held stationary by the ratchet 53, 54, during the viewing operation, applies frictional grip on the edges of the film by its convergently inclined flanges 30 sufficiently to cause the film to wind smoothly on the take-up spool 37 and with enough braking force to prevent this take-up spool from pulling the film away from the feed claw. The convergently inclined conical flange 38 of the take-up spool slightly tensions the film in this winding operation, causing it to coil smoothly on the spool.

The magnetic clutch 39, 41, affords slippage in this winding operation according to the snubbing action exercised by the roll 52.

As the end of the film on the supply reel 24 is approached and the feeler 76 closes switch 77, Fig. 4, the motor, through connections disclosed in the copending patent application, will be reversed and the solenoid 69 energized to swing the clutch belt 62 from engagement with clutch roll on looper shaft 67, over into engagement with the clutch roll on the reel shaft 25 and to open up the film gate 27 and retract the claw 28 from its film engaging position.

Then, with the motor running in the opposite direction, the reel 24 will be driven to rewind the film thereon and the film will be free to pass from the receiver pan, about the snubber roll 52, which then, through release of ratchet 53, 54, rotates freely and about loopers 29 and 31, which also turn freely under the pull of the film, applying a desired tension on the film rewinding on the reel.

In this reverse, rewinding operation the one-way drive clutch at 86 permits shutter shaft 48 to remain stationary and the magnets 39 of the magnetic drive clutch for the receiver will remain at rest while the pan and spool of the receiver will be free to turn, in the reverse direction, under the pull of the rewinding film. The armature 41 on the bottom of the pan, in coaction with the magnets, will then act as a magnetic brake, preventing overrunning of the pan and spool in this rewinding stage.

The two loopers 29 and 31 operate with fly-wheel effect to accomplish smooth feeding and guiding of the film, and the same is true of the snubber roller when that is operating in the film rewinding direction. The convergently inclined film gripping flanges of these rollers and of the take-up spool many be substantially alike, that is, at substantially the same incline or angle, to operate to the same effect in automatically gripping the edges of the film.

The machine illustrated is a complete unit, compact and fully portable, adapted for use on a desk or table, and may have a screen large enough for viewing by a number of people.

What is claimed is:

1. Apparatus for feeding motion picture film comprising means for supporting a supply reel of film, mechanism for intermittently advancing film from a reel on said supporting means, a continuously rotating looper positioned to take the film from a reel on said supporting means having opposed, convergently inclined flanges positioned to grip the opposite edges of film to withdraw it from the reel, a second, similar, continuously rotating looper interposed between said first continuously rotating looper and said intermittent film advancing mechanism and positioned to take the film withdrawn by said first looper and to advance a free loop of such film to said intermittent film advancing mechanism and means for rotating said second looper at a rate to keep said intermittent film advancing mechanism supplied with a loop of free film and said first looper at a rate to maintain a loop of free film for said second looper to advance to the intermittent film advancing mechanism said first and second continuously rotating loopers being arranged in succession in alignment with film coming off the reel and film guiding means for keeping the film from the reel looped about said loopers, said loopers consisting each of a smooth surfaced roll free of sprocket teeth or other projections so as only to frictionally grip opposing edges of the film when such film becomes tightened about the roll, and said rolls being constantly driven and rotating on fixed centers in the direction to withdraw film from the reel and toward the intermittent film advancing mechanism, whereby to jointly cooperate in taking film from the reel and keeping the intermittent film advancing mechanism supplied with a free loop of film and both said rolls having opposed convergently inclined flanges spaced to frictionally grip the opposing edges of the film.

2. Apparatus for feeding motion picture film comprising means for supporting a supply reel of film, mechanism for intermittently advancing film from a reel on said supporting means, a continuously rotating looper having opposed, convergently inclined flanges positioned to grip the opposite edges of film to withdraw it from the reel, a second, similar, continuously rotating looper interposed between said first continuously rotating looper and said intermittent film advancing mechanism and positioned to take the film withdrawn by said first looper and to advance a free loop of such film to said intermittent film advancing mechanism and means for rotating said second looper at a rate to keep said intermittent film advancing mechanism supplied with a loop of free film and said first looper at a rate to maintain a loop of free film for said second looper to advance to the intermittent film advancing mechanism, a rotary film receiver and a snubber roll having inclined film gripping flanges similar to the loopers, positioned for engagement with the film entering said receiver.

3. Apparatus for feeding motion picture film comprising means for supporting a supply reel of film, mechanism for intermittently advancing film from a reel on said supporting means, a continuously rotating looper having opposed, convergently inclined flanges positioned to grip the opposite edges of film to withdraw it from the reel, a second, similar, continuously rotating looper interposed between said first continuously rotating looper and said intermittent film advancing mechanism and positioned to take the film withdrawn by said first looper and to advance a free loop of such film to said intermittent film advancing mechanism and means for rotating said second looper at a rate to keep said intermittent film advancing mechanism supplied with a loop of free film and said first looper at a rate to maintain a loop of free film for said second looper to advance to the intermittent film advancing mechanism, a rotary film receiver and a snubber roll having inclined film gripping flanges similar to the loopers, positioned for engagement with the film entering said receiver, and ratchet mechanism for holding said snubber roll against rotation with the film entering said receiver and permitting said roll to turn freely in the reverse direction.

4. Apparatus for feeding motion picture film comprising means for supporting a supply reel of film, mechanism for intermittently advancing film from a reel on said supporting means, a continuously rotating looper having opposed, convergently inclined flanges positioned to grip the opposite edges of film to withdraw it from the reel a second, similar, continuously rotating looper interposed between said first continuously rotating looper and said intermittent film advancing mechanism and positioned to take the film withdrawn by said first looper and to advance a free loop of such film to said intermittent film advancing mechanism and means for rotating said second looper at a rate to keep said intermittent film advancing mechanism supplied with a loop of free film and said first looper at a rate to maintain a loop of free film for said second looper to advance to the intermittent film advancing mechanism, a rotary film receiver and a snubber roll having inclined film gripping flanges similar to the loopers, positioned for engagement with the film entering said receiver, and ratchet mechanism for holding said snubber roll against rotation with the film entering said receiver and permitting said roll to turn freely in the reverse direction, and means for rotating said film receiver in a film winding direction during unwinding of the film from the supply reel and including slip clutch means permitting said receiver to rotate in the opposite direction for rewinding of the film on the supply reel.

5. Film feeding apparatus comprising a vertical shaft for supporting a supply reel of film in horizontal relation, a horizontally disposed, rotary film receiver, a horizontal film guide between said supply reel supporting shaft and film receiver, an oscillating claw for intermittent feeding engagement with film in said guide, means for withdrawing free loops of film from a supply reel on said shaft and for passing it on to said oscillating claw, a snubber roll positioned for engagement with film entering said receiver, ratchet means for holding said snubber roll against movement with the film entering said receiver and for permitting free movement of said roll with film being withdrawn from said receiver and means for rotating said film receiver in the direction to wind the film therein and for permitting free rotation of the receiver in the opposite direction and whereby film taken from the supply reel will be wound smoothly in the receiver under control of the snubber roll and will be removed from the receiver for rewinding on the supply reel under control of the free rotation of the snubber roll, said snubber roll being a smooth roll free of sprocket teeth or other projections and having convergent flanges engageable with the edges of the film and means confining and guiding the film in the form of a loop about said snubber roll.

References Cited in the file of this patent

UNITED STATES PATENTS

| | | |
|---|---|---|
| 1,551,037 | Lube | Aug. 25, 1925 |
| 1,823,245 | Wittel | Sept. 15, 1931 |
| 1,913,087 | Oehmichen | June 6, 1933 |
| 2,015,860 | May | Oct. 1, 1935 |
| 2,025,361 | Skilling | Dec. 24, 1935 |
| 2,046,723 | Brownscombe | July 7, 1936 |
| 2,392,492 | Morgan | Jan. 6, 1946 |
| 2,487,476 | Pratt | Nov. 8, 1949 |
| 2,494,842 | Thevenaz | Jan. 17, 1950 |
| 2,577,175 | Akers | Dec. 4, 1951 |